May 31, 1949.    F. M. FISHER ET AL    2,471,867
METHOD OF PROCESSING CHEESE AND PACKAGE THEREFOR
Filed Dec. 26, 1945
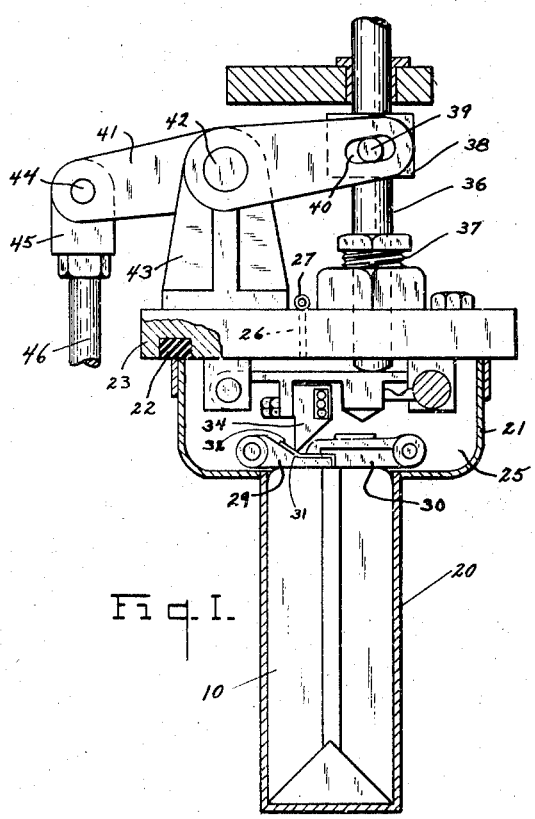
Fig. I.
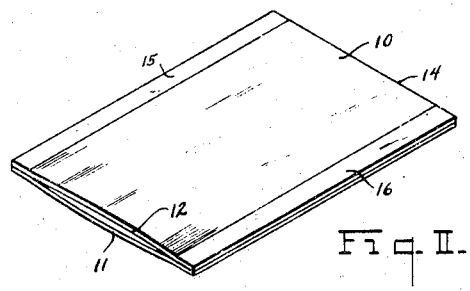
Fig. II.
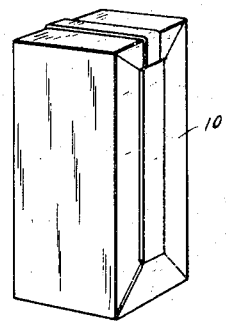
Fig. III.
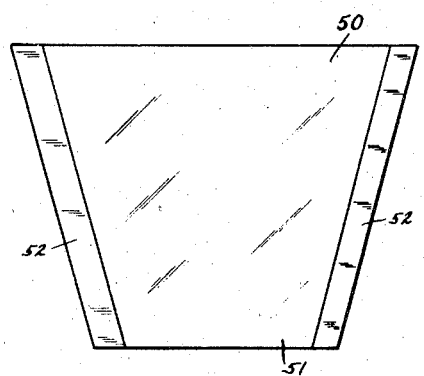
Fig. IV.
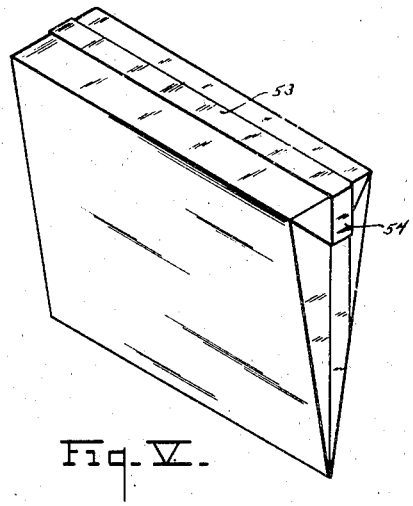
Fig. V.
INVENTORS.
FRANKLIN M. FISHER.
HAROLD C. HOPP.
BY Joseph B. Lindecker
ATTORNEY.

Patented May 31, 1949

2,471,867

UNITED STATES PATENT OFFICE 2,471,867

METHOD OF PROCESSING CHEESE AND PACKAGE THEREFOR

Franklin M. Fisher, New York, N. Y., and Harold C. Hopp, Des Plaines, Ill., assignors to Standard Cap and Seal Corporation, Chicago, Ill., a corporation of Virginia Application December 26, 1945, Serial No. 637,264

1 Claim. (Cl. 99—116)

This invention relates to the method of the vacuum packaging of commodities and more especially to the vacuum packaging of cheese or oleaginous substances and to the finished package.

The production and distribution of natural cheese such, for example, as American Cheddar and the like is enormous and has heretofore been hampered by reason of the difficulties of packaging the cheese at the time it is manufactured, since approximately 800 million pounds are produced per year in the United States and require treatment and storage. Several methods of packing have been proposed wherein the cured cheese is placed in a mold, subsequently introduced into a wrapping or envelope, and replaced in a mold and compressed by mechanical means to produce a finished package. This type of processing and packaging requires the precuring of the cheese which consumes a considerable period of time and such method of processing, handling and packaging is expensive. Said cheese was usually put in cumbersome traditional shapes, longhorns, drums and wheels which required hand slicing for retail trade. Attempts have been made to mold partially cured cheese and enclose the same in an envelope and pressure applied to form a finished package but the further curing of the cheese after packaging results in the formation of gases and mold growth accompanied by a loss of moisture content which is highly objectionable in the packaged commodity.

It is an object of this invention to process and package uncured or partially cured natural cheese by an arrangement of placing the envelopes containing the cheese under reduced pressure providing a finished package which may be transported while remaining under a vacuum condition.

Applicants have found that by packaging cheese in a manner inhibiting substantial contact of air with the packaged cheese, that the cheese will knit together into an integrated mass under the influence of external atmospheric pressure. The curing of natural cheese has been found to proceed in a normal manner when packaged under vacuum conditions.

An object of the invention is processing and packaging of uncured or partially cured cheese in such a manner that the completion of the curing will proceed in a normal manner while the packaged commodity is being distributed for consumer use, thus minimizing the length of processing time.

A further object resides in the processing and packaging of cheese wherein the uncured or partially cured product in packaged form may be immediately dispatched to distributors and dealers thus eliminating an expensive and time consuming storage of cheese for curing purposes.

A further object of the invention resides in hermetically closing a package of cheese in an envelope by the use of sealable means while impressing a vacuum or reduced pressure interiorly of the package.

Another object of the invention resides in a method of processing and packaging cheese which eliminates the paraffining which has heretofore been resorted to in order to prevent excessive dehydration of the surface.

Another object resides in a method of packaging cheese in preparation for consumer use wherein the formation of a rind on the cheese is eliminated, thus avoiding unnecessary waste which inherently results when a rind is formed upon cheese.

Another object of our invention is the method of processing and packaging of cheese which greatly facilitates the feeding or conveying of cheese to envelopes or containers wherein the handling of the cheese is reduced to a minimum and the cheese introduced into final packages of a size which may be delivered directly to the consumer without further handling and eliminating the subdivision of larger units of the commodity into smaller consumer size units.

Another object of the invention resides in the packaging of cheese wherein the same is hermetically sealed in a package so that the commodity reaches the consumer in sealed condition with the possibility of contamination of the commodity by contact with foreign substances eliminated.

Still another object is the provision of a vacuum sealed package of cheese wherein mold growth and undesirable deterioration as well as shrinkage through loss of moisture are substantially eliminated.

Further objects and advantages are within the scope of this invention such as relate to the arrangement, operation and function of the related elements of the structure, to various details of construction and to combination of parts, elements per se, and to economies of manufacture and numerous other features as will be apparent from a consideration of the specification and drawing of a form of the invention, which may be preferred, in which:

Figure 1 is a vertical sectional view through a package mold and associated mechanism illustrating an apparatus for folding, vacuumizing and thermo-sealing the filled package;

Figure 2 is a perspective view showing an envelope or container suitable to receive a quantity of cheese or oleaginous commodity;

Figure 3 is a perspective view illustrating the envelope of Figure 2, which contains the commodity, vacuumized and sealed to provide a finished packaged unit;

Figure 4 is an elevational view of an envelope or receptacle of modified configuration, and Figure 5 is a perspective view of a completely sealed and vacuumized package of cheese or oleaginous commodity contained within the envelope of the form illustrated in Figure 4.

While our invention embraces the processing and packaging of uncured or partially cured cheese in accordance with the principle of our invention, it is to be understood that we contemplate our method of processing and packaging of other commodities or substances for curing and preservation purposes wherever the same may be found to have utility.

In carrying on or practicing our invention in practical application, we have found that the invention has particular utility in the processing and packaging of natural cheese. A typical illustration of the initial processing of an American Cheddar type cheese is as follows; a quantity of whole milk is placed in a suitable vat or receptacle and heated for a predetermined period of time and a starter or catalyst added, for example rennet, which facilitates the precipitation and coagulation of the curd from the milk. After the coagulaiton of the curd is completed, the whey is drawn from the vat leaving the curd residue therein. The curd is subsequently removed from the vat and allowed to "knit" or partially cure for a comparatively short period of time. The partially "cured" curd is then put through a curd mill where the same is cut into strips, which are subsequently cut or subdivided into small pieces or particles.

In carrying out the packaging of the cheese, it is desirable to utilize an envelope or container preferably fabricated of material which may be readily and quickly sealed to provide a hermetically closed package. We have found that an envelope fabricated of material having thermoplastic or thermo-sealable properties is satisfactory for the purpose. There are several materials available at the present time which are thermo-sealable as, for example, a flexible material known as rubber hydrochloride; said material sold usually under the trade-name of Pliofilm, compounds of wax and rubber, and various materials fabricated of vinyl resins. Certain materials may be sealed by pressure and others by heat and pressure combined and the present invention contemplates utilization of any type of sealing which will render the package hermetically closed.

Figure 2 illustrates a suitable configuration of envelope, bag or container which may be formed of adjacent plies 11 and 12 formed by folding sheet of material along a median line 14, the juxtaposed opposite edge portions being presealed or fused together as at 15 and 16 by thermo-sealable or pressure means. The envelope or flexible container 10 is preferably disposed within a mold 20 with the mouth portion of the container open to receive the particles of cheese conveyed thereto by conventional means (not shown). In the embodiment illustrated in Figures 1 through 3 inclusive the mold 20 is of rectangular configuration to form a finished package of the contour illustrated in Figure 3. After the introduction of the cheese particles into the envelope 10, a suitable plunger (not shown) may be utilized to exert pressure upon the cheese in the package to initially compress the cheese in the package. The mold 20 supporting the envelope 10 filled with cheese is brought into position where the edge of the flared portion 21 is in sealing engagement with a gasket 22 disposed in a groove formed in a plate 23 forming a part of the sealing apparatus. The plate 23 and flared portion 21 forms a chamber 25 containing the envelope or package sealing mechanism. The plate 23 is provided with an opening or channel 26 which communicates with a tube 27 connected to a vacuum producing pump or other suitable means for withdrawing or evacuating air from the chamber 25 and hence from the interior of the envelope and the interstitial spaces in the cheese. The vacuum or sub-atmospheric pressure is maintained very high in order to evacuate as much air as is practically possible from the chamber 25 and package 10 to establish as great a differential in pressure as can be obtained between atmospheric pressure and the reduced pressure in the package. While the chamber 25 and package 10 are under the influence of sub-atmospheric pressure produced by a vacuum pump, the sealing means is brought into operation to effectively and hermetically seal the mouth of the envelope or package 10. As will be noted from Figure 1, a pair of pivotally mounted fingers 29 and 30 are provided to configurate or fold the projecting portions 31 and 32 of plies 11 and 12 into intimate contact, the fingers 29 and 30 being actuated by suitable mechanical means (not shown). The portions 31 and 32 of the envelope 10 are engaged by an electrically heated unit or sealing instrumentality 34 which is brought into sealing engagement under the influence of downwardly acting pressure exerted through the medium of a vertical plunger or ram 36 which presses through a stuffing gland 37 and into the chamber 25. The plunger or ram 36 is provided with an enlarged portion 38 having laterally projecting trunnions 39 which project into and co-operate with slots 40 formed in one end of a walking beam 41 which is fulcrumed upon a shaft 42 supported in a bracket 43, the latter being mounted upon the plate 23. The other end of the beam 41 is provided with a projecting pin 44 pivotally joined with a clevis 45 to which is connected an operating rod 46 for causing oscillatory movement of the walking beam 41 and hence vertical movement of the plunger 36.

After the receptacle 10 containing the cheese has been thus sealed while disposed in the mold 20, the vacuum connection 27 may then be arranged to admit air into the chamber 25 equalizing the pressure and thus relieve the seal between the wall 21 and the sealing gasket 22 carried by plate 23. After the mold 20 has been removed from engagement with the gasket in plate 23, the filled and hermetically sealed package is removed from the mold and the projecting sealed portions 31 and 32 subsequently folded or pleated to the configuration of the finished package as shown in Figure 3. Due to the fact that the envelope is imperforate and is hermetically sealed under vacuum, the atmospheric pressure acting exteriorly on the package compresses and maintains the particles of cheese in close relationship causing the cheese to "knit" or cure into a homogeneous solid mass. The aging or curing of the cheese progresses after the completion of the packaging operation, and such curing takes place at suitable temperatures in the absence of air so that there is no resulting formation of dry rind as there is no loss of moisture. The sealed package may be transmitted to far away markets, the aging or curing of the cheese taking place during distribution at suitable temperatures.

The natural cheese after being processed through the curd mill may be first molded into a large cake or body which may be subsequently subdivided into smaller units which may be introduced into an envelope and the same "vacuumized" and sealed in the manner hereinbefore explained.

A further modification of the processing resides in molding the curd into individual units or blocks of a size appropriate to fit into one of the envelopes, after which the package containing the cheese block may be vacuumized and sealed.

Figures 4 and 5 illustrate a further form of envelope and package construction. In this form, the unfilled envelope 50 is of trapezoid shape, the envelope being preferably formed from a single sheet of sealable material folded about a median line 51. The non-parallel edge portions 52 are pre-sealed by the use of heat and pressure or both. When envelopes of the configuration shown in Figure 4 are employed, the mold 20 is preferably configurated to the reciprocal shape of the finished package as shown in Figure 5. The steps of filling the envelope with a commodity, vacuumizing the package and subsequently sealing the portions of the envelope adjacent the mouth of the package are carried out in the same manner as hereinfore described with respect to the envelope and package shown in Figures 1, 2 and 3. It will be noted that the finished filled package as illustrated in Figure 5 is of a wedge shape. The portions of the envelope 50 which are overlapped and hermetically sealed are folded to the position indicated at 53 in Figure 5 lengthwise at the top of the package and depending over the end walls of the package as indicated at 54.

Other configurations of envelope and finished package may be utilized without departing from the spirit of the invention.

The finished packaged units of cheese may be of many sizes and weights and the present invention is particularly applicable to the processing and packaging of cheese or oleaginous commodities where it is desirable to hermetically seal the commodity. Many types of cheese whether cured, uncured or partially cured may be packaged in accordance with the present invention, and the subsequent curing of the cheese takes place in the package. Due to the evacuation of substantially all the atmospheric air from the interior of the package, the formation of mold is practically inhibited and the generation of gases which normally form in the aging of cheese is substantially virtually eliminated. Furthermore the vacuum packaging results in a complete and final knitting of the cheese without the formation of rind and shrinkage due to loss of moisture. Due to the fact that the cheese is subjected to curing in a vacuum condition, generation of gases is substantially non-existent, so there is substantially no bloating or bulging of the package. Immediately after the vacuumized package is removed from the mold, it may be shipped for distribution and delivered to the ultimate consumer still in vacuumized condition. The physical characteristics of a vacuumized package of cheese is that of a solid homogeneous mass by reason of the evacuation of air from all of the interstitial spaces existent in the cheese mass.

It is apparent that, within the scope of the invention, modifications and different arrangements may be made other than is herein disclosed, and the present disclosure is illustrative merely, the invention comprehending all variations thereof.

What we claim is:

A method of knitting a mass of natural, unknitted, uncured cheese-curd in an envelope formed of non-hygroscopic material which consists in the steps of placing the envelope in a mold, filling the envelope with a quantity of natural, unknitted, uncured cheese, of thereafter evacuating air from the interior of the envelope and said mold, of hermetically closing and sealing the filled envelope, and of removing the sealed envelope from the mold and evacuating zone whereby the atmospheric pressure exterior of said envelope solely compresses the natural, unknitted, uncured cheese into a solid mass and causes knitting thereof.

FRANKLIN M. FISHER.
HAROLD C. HOPP.

REFERENCES CITED

The following references are of record in the file of this patent:

UNITED STATES PATENTS

| Number | Name | Date |
| --- | --- | --- |
| 1,993,442 | Greven | Mar. 5, 1935 |
| 2,077,300 | Abrams et al. | Apr. 13, 1937 |
| 2,189,512 | Berch | Feb. 6, 1940 |
| 2,267,320 | Berch | Dec. 23, 1941 |